Oct. 11, 1949.  A. ADRIANOFF  2,484,064
HEARTH FOR BURNING SOLID FUELS
Filed May 7, 1942

Inventor
A. Adrianoff
By Watson, Cole, Grindle & Watson
Attorneys.

Patented Oct. 11, 1949

2,484,064

UNITED STATES PATENT OFFICE 2,484,064

HEARTH FOR BURNING SOLID FUELS

Alexandre Adrianoff, Ixelles-Brussels, Belgium, vested in the Attorney General of the United States Application May 7, 1942, Serial No. 442,130
In France October 23, 1940

Section 1, Public Law 690, August 8, 1946
Patent expires October 23, 1960

3 Claims. (Cl. 110—24)

The hearths designed and carried out hitherto in practice can not rationally use indifferently fuels leaving slags or other fuels leaving ashes as a residue.

The hearths designed for residues assuming the form of compact slags can not tolerate even a partial formation of ashes; on the other hand hearths planned for residues assuming the form of ashes stop working correctly as soon as said residues appear under the form of slags.

The hearths with movable grates allowing to a certain extent to separate the ashes from the slags have the disadvantage, especially in the case of small-size fuel, that they allow the passage into the ash-pit of a substantial proportion of unburnt fuel.

The hearths of the compound type, in which the slags or the ashes are transferred from a main hearth in an auxiliary hearth operated parallelly with the first have the drawback that they produce waste gas the composition of which varies greatly according to the proportion of combustible matter which happens to be in the auxiliary hearth.

As to the hearths with mechanical slagging, they need not only a mechanism often quite delicate and always expensive, but they require accurate regulating, which depend from the quality of the fuel and which must be altered each time the quality of fuel changes, for want of which they discharge a large proportion of unburnt fuel together with the residues or allow on the contrary the residues to accumulate in the hearth.

The object of this invention is to provide a hearth intended for use of solid fuels leaving ashes having any melting point, which allows use in the same hearth of fuels of different grades leaving as combustion residues hard slags as well as ashes without any change of the regulating of the apparatus or any intervention of mechanical members, while allowing at the same time to do completely away with the losses due to unburnt fuel in the residues.

Figure 1:
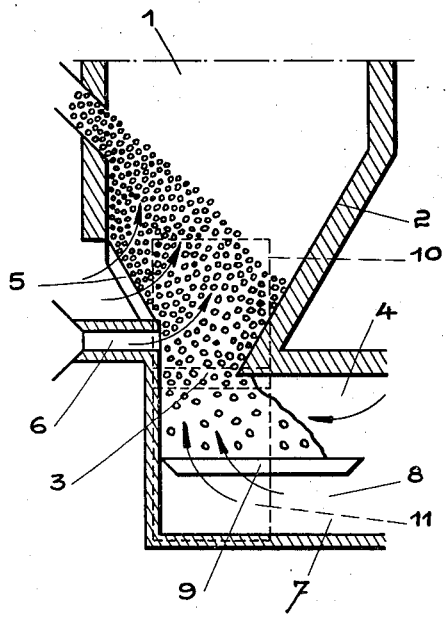
Figure 2:
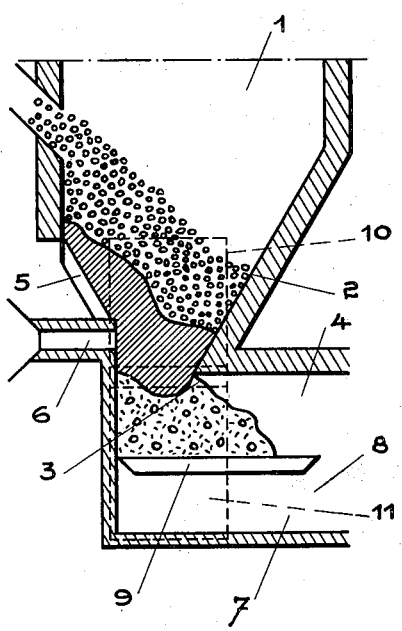
Figure 3:
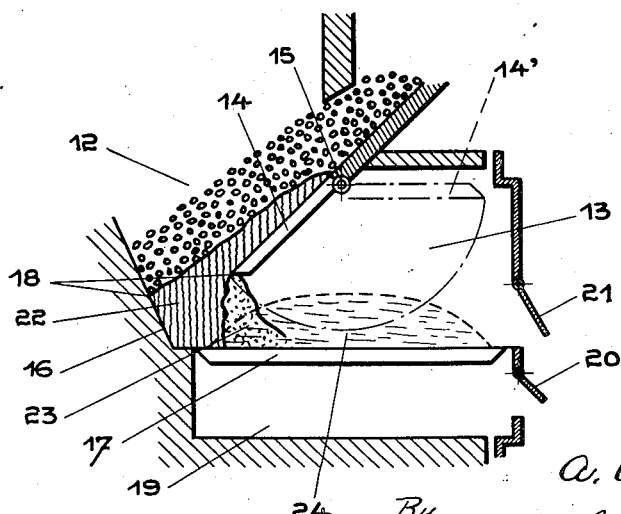

The accompanying drawing shows on Figures 1 and 2 vertical sections of an embodiment of the invention and Figure 3 shows also a vertical section of a modification of the relationship of the various parts, the principle remaining the same.

Figure 1 shows for example a main hearth 1, fed with fuel, by hand, mechanically or by gravity and provided with walls 2, supporting the fuel, which walls have a slant sufficient to prevent the fuel and the ashes from adhering to them. Said Figure 1 shows also a secondary hearth 4, into which the fuel after having passed through hearth 1 slides to complete its combustion and which is connected with said hearth 1 by means of an opening wide enough to allow the free passage of the ashes, the small-size slag and the fuel, the opening being located in such relationship to said main hearth and to said auxiliary hearth, that no portion of the mass burning in said main hearth is prevented from having access to said auxiliary hearth.

The primary air is conveyed to the main hearth through a grate 5 or a nozzle 6, or simultaneously through both these members or else by any other device. The primary air is conveyed to the secondary hearth through the ash-pit 7 and the grate 9 or the opening 8 or by means of any other device. It is well understood that for both hearths the air may be sucked-in by natural or induced draft or blown-in under pressure.

When air under pressure is used it is of course distributed so that the air entering the principal hearth may never be driven back into the auxiliary hearth, i. e. so that the gases coming from said auxiliary hearth can always be discharged through the principal hearth.

Doors, such as 10 and 11 shown in dotted lines on Figures 1 and 2 are provided for access to hearths 1 and 4 respectively.

Furthermore, as in most hearths, the hearth according to the invention may be provided with secondary air entrances (not shown on the drawing) located in accordance with the usual practice.

The hearth above described works as follows.

When hearth 4 works with a slow-pace combustion, the fuel which it contains or the replacement fuel coming from hearth 1 leaves always as a residue ashes or slag fragments of very small size. When the main hearth 1 works at a quick-pace, it produces according to the character of the fuels, hard slags, brittle slags together with more or less ashes and in some very rare cases only ashes.

When slags are formed in the main hearth they can not run down into the auxiliary hearth for, as they are in a melted form only adjacent to grate 5 or nozzle 6, they are kept back by the fuel or the ashes contained in the secondary hearth.

On the contrary, the ashes or small size slags coming from the main hearth slide into the secondary hearth until the latter contains only residues.

The hard or brittle slags formed in the main hearth set down upon grate 5, on the wall or walls of nozzle 6 and eventually upon the wall above the opening 8. They form then a bridge shown in section on Figure 2.

Slagging of the apparatus is generally effected in two moves as follows:

1. The lower door 11 is opened and the ashes and small slags, which form the contents of the auxiliary hearth 4 and those, which may have fallen into the ash-pit 7 are removed, whereupon door 11 is closed again.

2. The slags are removed from the main hearth 1 by means of a poker through door 10. By this removal the ashes, the small slags and some of the glowing fuel which lies on top of the slags drop automatically into the auxiliary hearth. The main hearth is thus entirely cleaned. The auxiliary hearth is provided for a capacity always great enough to store up besides the residues a certain amount of burning fuel. The fuel goes on burning when it has arrived in the auxiliary hearth and the ashes it produces will be removed cold, as well as the ashes from the first slagging of the main hearth, in course of the following emptying of the auxiliary hearth.

As both hearth 1 and 4 are placed in series, there is no need of paying attention, as would be the case if both hearths should work parrallelly, to the percentage of combustible matter in the auxiliary hearth, which percentage moreover varies continually as the combustion proceeds to its end in said hearth. In fact the process faced is the following: as long as there is combustible matter in the auxiliary hearth, the combustion gases coming from this hearth slow down the main hearth. As the amount of combustible matter becomes less in the auxiliary hearth, the gases coming from the latter contain more and more air in excess, which speeds up the main hearth.

The total amount of thermal units produced in a given time by both hearths remains thus substantially the same, whatever the percentage of combustible matter in the auxiliary hearth may be. Likewise said percentage has no noteworthy influence upon the composition of the combustion gases discharged by both hearths together.

Figure 3 shows a modification based on the same principle.

Referring to this figure, 12 is the main hearth and 13 the auxiliary hearth. The primary air is admitted to the main hearth through the grate 14, which is adapted to rotate about an axis 15 to assume the position indicated by the numeral 14'. The movable grate 14 defines between its free end, and the wall 16 and the grate 17, the space 18. Primary air for the auxiliary hearth 13 is introduced through the ash-pit 19 and grate 17. Door 21 gives access to hearth 13, and door 20 to the ash-pit 19.

When hearth 12 is slagged up, one proceeds to remove the ashes which lie in 23 and to rotate then the grate 14 to the position shown in 14'. The slag 22 is removed by means of a poker. The glowing fuel contained in hearth 12 and the ashes which may be found above the slag fall upon grate 17 where they form a heap 24. Grate 14 is then restored to its position and some glowing fuel is pushed back into the opening 18. Grate 14 is then fed again. The combustion gases coming from hearth 13 pass through grate 14 and opening 18 into hearth 12.

By the next slagging, hearth 13 is first emptied whereupon the same course as hereinabove described is followed.

In comparison with the known art the new device possesses the following advantageous features:

1. The possibility of burning in the same hearth, without any change of regulating, different kinds of fuel without regard to the melting point of the ashes.

2. The feasibility of burning fuels whose residues melt at very low temperatures, without impairing in the least the speed of combustion of the hearth as a whole, because the temperature within the burning layer of fuel in the hearth 1 is maintained comparatively low so that the combustion gases of hearth 4, and more particularly the carbon dioxide can pass through said layer of fuel.

3. The possibility of burning fuels of very different sizes, although the variation of the size entails the variation of the character of the combustion residues.

4. The possibility of operating the hearth at any pace, from the quickest to the slowest without fear about the variation of the character of the residues, which is the unavoidable result of a change of pace.

5. The possibility after regulating once for all the hearths, of maintaining an optimum composition of the burnt gases during the whole duration of the operation between two slaggings.

6. The absence of any mechanical part and hence low cost price and full security of operation.

It is well understood that the accompanying drawings are diagrammatic and are given only by way of examples, as other embodiments of the process disclosed hereinabove would fall within the scope of this invention as set forth in appending claims.

What I claim is:

1. A blast furnace comprising an upper hearth in which the solid fuel charge introduced at the upper end subsides gravitationally, a lower hearth having a portion located beneath the upper hearth, the lower end of the upper hearth having a somewhat restricted discharge opening through which unburned fuel and ashes in the upper hearth contact and rest upon unburned fuel and ashes in the lower hearth as combustion progresses, a generally horizontal grating in said lower hearth supporting the burned and unburned fuel and ashes fallen from the upper hearth through said opening, first forced air entrance means entering the lower part of the upper hearth adjacent to said opening and inducing maximum combustion in a manner to produce a high temperature zone in said upper hearth at a point above said opening, in which formation of slag can take place, said grating being spaced from the bottom of the lower hearth to provide second forced air entrance means below the grating and above the grating, and means for passing air under pressure through said second forced air entrance means in a manner to cause air and combustible gases from the combustion on the grate to pass upwardly through the discharge opening and into the lower part of the charge in the upper hearth so as to control the rate of combustion in the said upper hearth.

2. A compound furnace comprising upper and lower hearths in which combustion proceeds contemporaneously and in which solid fuel composed of particles of different sizes and grades is usable without any adjustment of the hearths relative to each other or interruptions of the operation of the furnace, said upper hearth having relatively constricted discharge conduit at its lower end communicating with the lower hearth by means of which burned and unburned fuel particles and ashes resulting from combustion in the lower part of the upper hearth can pass into the lower hearth, a generally horizontal grating in said lower hearth beneath said discharge conduit and upon which the fuel particles and ashes fall from said discharge conduit, a first forced air entrance means for applying air under pressure to the lower part of the upper hearth and being thereby prevented from being discharged onto said grating to provide a high temperature zone in which slagging can take place, the resultant slag being supported in the lower end of the upper hearth by the fuel and ashes accumulated in the grating of the lower hearth, and a second forced air entrance means for applying air under pressure upwardly through a charge on said grating in the lower hearth, so as to force unburned gas evolved by combustion on said grating in said lower hearth upwardly through said discharge conduit into said upper hearth in a manner to control the rate of combustion in the upper hearth.

3. A compound furnace according to claim 2 wherein said hearths and said forced air entrance means are arranged so that an increase in gas evolved in said lower hearth reduces the proportion of air forced into the upper hearth due to combustion of a charge in said lower hearth thereby producing a reduced rate of combustion in said upper hearth, whereas a reduction in the gas evolved by combustion in said lower hearth permits a greater proportion of air to be forced through said conduit into said upper hearth thereby producing greater combustion of the charge in said upper hearth, with proportionately greater discharge of fuel and ashes into the lower hearth.

ALEXANDRE ADRIANOFF.

REFERENCES CITED

The following references are of record in the file of this patent:

UNITED STATES PATENTS

| Number | Name | Date |
|---|---|---|
| 23,363 | Gilliland | Mar. 29, 1859 |
| 43,328 | Morison | June 28, 1864 |
| 145,253 | Stuart et al. | Dec. 2, 1873 |
| 181,090 | McClamroch | Aug. 15, 1876 |
| 207,142 | Tufts | Aug. 20, 1878 |
| 317,901 | Wells | May 12, 1885 |
| 527,106 | Burk | Oct. 9, 1894 |
| 574,845 | Fales | Jan. 5, 1897 |
| 644,792 | Boal | Mar. 6, 1900 |
| 652,297 | Smead | June 26, 1900 |
| 888,380 | Andrews | May 19, 1908 |
| 1,379,448 | King | May 24, 1921 |
| 1,869,949 | Szikla et al. | Aug. 2, 1932 |

FOREIGN PATENTS

| Number | Country | Date |
|---|---|---|
| 1,812 | Great Britain | Jan. 26, 1903 |
| 9,789 | Austria | Nov. 10, 1903 |
| 98,828 | Sweden | May 7, 1940 |
| 449,300 | Germany | Sept. 10, 1927 |
| 845,433 | France | May 15, 1939 |